Feb. 25, 1964 M. L. KASBOHM ETAL 3,121,999
DILUTION SYSTEM FOR EVAPORATION GAS
Filed June 26, 1961

INVENTORS
MARTIN L. KASBOHM
DONALD B. McWHORTER
BY William F. Mesinger
ATTORNEY 3,121,999
DILUTION SYSTEM FOR EVAPORATION GAS
Martin L. Kasbohm, Williamsville, and Donald B. Mc-
Whorter, Tonawanda, N.Y., assignors to Union Carbide
Corporation, a corporation of New York
Filed June 26, 1961, Ser. No. 119,542
8 Claims. (Cl. 62—48)

This invention relates to the handling of combustible gases having a wide range of explosive mixtures with air and more particularly to method and apparatus for diluting such hazardous gases with ambient air in a safe and efficient manner.

It is often desirable to store and ship low-boiling liquefied gases in insulated tanks at low to medium pressures. For example, large amounts of liquid hydrogen are often shipped in railroad tank cars. In such instances, the excess pressure build-up in the tank requires continuous or intermittent venting of the evaporating gas. Since hydrogen is flammable (i.e. hazardous), circumstances make it necessary to dilute the gas with some available relatively inert gas to a satisfactory low level before release to the atmosphere. It is most convenient to dilute such hazardous gas by mixing with ambient air.

The main object of this invention is to provide a novel method for safely, simply, and effectively diluting an escaping hazardous gas with an inert gas to safe proportions.

Another object is to provide a method for diluting hydrogen gas with ambient air.

Still other objects are: to provide novel apparatus for accomplishing the method of the invention; to provide apparatus which is simple and economical; to provide apparatus for diluting evaporation gas for both stationary and mobile tank installations.

Other objects will either be pointed out or become apparent from the following disclosure.

Throughout this specification the word hazardous is used to mean gases which are flammable or toxic and includes for example, hydrogen, methane, ethylene, fluorine, etc.

In its broadest aspects, the objects of the invention are accomplished generally by providing a system for disposing of pressurized hazardous evaporation from a low-boiling liquefied gas wherein an insulated gas container in which a hazardous gas is stored and/or shipped, is connected in flow relation to a work-expansion device, which is preferably a positive displacement type gas motor. At least a portion of the pressurized evaporation gas from the gas container is passed through the gas motor. The pressurized gas expands through the motor and generates sufficient power to drive a mixing device which is preferably an axial flow propeller-type fan. This fan draws enough air from the intake side thereof to the discharge side thereof to dilute all the expanded evaporation gas discharged in the vicinity of the discharge side of the fan to a safe level below the lower flammable or safe toxic limit. Of course, if desirable, the expanded evaporation gas could be discharged into the intake side of the fan and then mixed with the air being drawn through the fan and discharged as a safe mixture from the discharge side of the fan.

The inventive method and apparatus will be described in more detail in referring to the drawings in which.

The methods and apparatus of the invention have marked advantages over methods and apparatus available in the prior art. The invention system has at least about 2½ times the efficiency of energy conversion as other type mixing devices such as aspirators and ejectors. The efficiency of such devices is so low that many gases at low pressure, such as the hydrogen from a tank car, cannot be diluted with air to below their hazardous limit.

Another advantage of the present invention is that it is self-contained and does not rely on an external source of power, consequently the system is more reliable and versatile. A further advantage is that the present system does not rely on motion of the storage container to obtain adequate dilution with atmospheric air. For example, if the storage container is a tank car, the mixture system can still operate even though the railroad tank car is stopped. Also, the apparatus required is simple and economical, and has been designed to minimize the effect upon adequate dilution of the tank orientation relative to direction of tank motion and wind direction.

Figure 1:
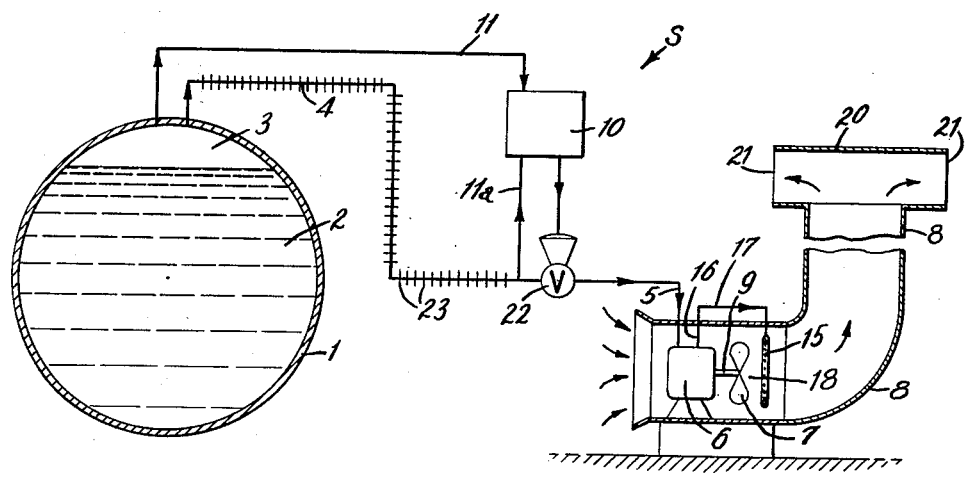
FIGURE 1 is a schematic diagram of the preferred embodiment of the invention.

Referring more specifically to the drawings in FIGURE 1, the inventive system is denoted generally at S. Insulated gas container 1 which is partially filled with liquefied gas 2 so as to form a gas space 3 thereabove is connected at the top side thereof to a conduit 4 which communicates at its outlet end 5 with a work expansion device 6 such as a positive displacement type gas motor. Connected to the shaft 9 of motor 6 is an air moving or mixing device 7 such as an axial flow type fan. The motor 6 has an outlet 16 connected by conduit 17 to a perforated diffuser ring 15 positioned adjacent the discharge side 18 of fan 7 so that gas discharged from the ring 15 is dispersed throughout a plane which may be essentially perpendicular to the direction of air issuing from the discharge side 18 of fan 7. Enclosing the motor 6, fan 7 and ring 15 is a hood 8 which is provided at its exit end 20 with outlets 21, 21. Connected in the conduit 4 is a control valve 22. Control valve 22 is actuated by a pressure sensitive controller 10 which has a pressure tube 11 communicating with the top side of container 1, and pressure tube 11a connected to conduit 4. Gas pressure energy is thus supplied through conduit 11a to the controller 10 to actuate valve 22 in response to the pressure signal from tank gas space 3 through conduit 11. A control pressure signal is thus passed to the controller 10 which in turn operates to actuate valve 22.

Pressure controller 10 is self-contained, and requires no outside energy such as electricity. Locating the ring 15 downstream of the fan 7 instead of upstream thereof is done principally for safety reasons to avoid the possibility of having a flammable gas mixture come into contact with the fan blade where a spark might occur if the blade rubbed against the fan housing. Consequently, the fan blade is preferably made of a non-sparking material such as aluminum or bronze. The motor-fan unit may be oriented in any desired manner including having the shaft 9 vertical.

In operation, cold evaporation gas at superatmospheric pressure flows through conduit 4 which has a finned portion 23 thereof in heat exchange relationship with the surrounding atmosphere. Any heat exchange relationship would be suitable, for example, a portion of the conduit 4 could be immersed in a water bath. Thus, the evaporation gas is preferably warmed to near ambient temperature. The evaporation gas may be withdrawn either continuously or intermittently through control valve 22 and fed to the motor 6 where it is expanded to atmospheric pressure. This expansion generates power which drives shaft 9 and thus fan 7 connected thereto. The fan 7 moves sufficient ambient air to dilute to a safe mixture all the expanded hazardous gas which is being discharged from motor 6 through conduit 17 and ring 15.

Figure 2:
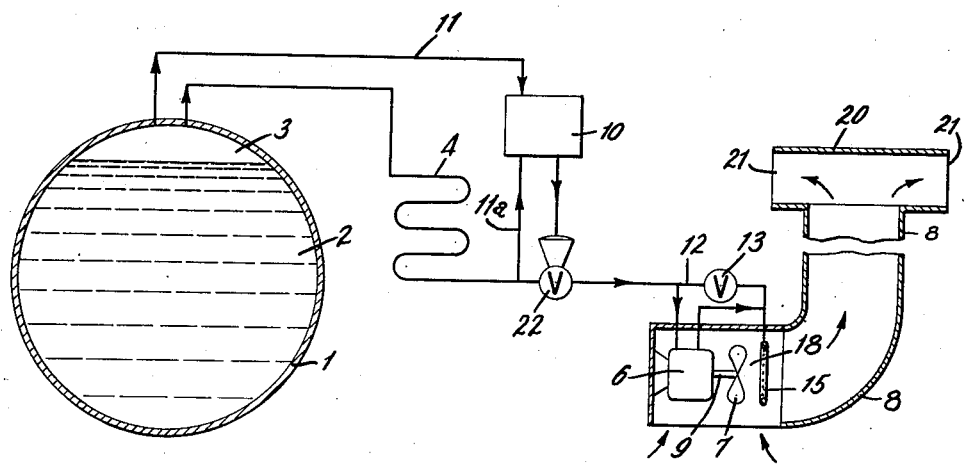
FIGURE 2 is a schematic diagram of a modification thereof.

FIGURE 2 illustrates a modification of the inventive system. Like parts in this embodiment bear the same reference character as in FIGURE 1. In this embodiment, the length of conduit 4 has been increased by bends or coils to form a curved portion thereby increasing the surface area available for heat exchange with the atmosphere. A branch by-pass line 12 is connected at one end to conduit 4 downstream of control valve 22 and at the other end to diffuser ring 15. A by-pass valve 13 is positioned in the branch line 12. In this modified system at least a portion of the evaporation gas is fed to motor 6. Any portion of the evaporation gas not needed in driving the fan is valve throttled through valve 13 to exhaust pressure and is then discharged together with the gas expanded in motor 6 through ring 15. By-pass valve 13 may be controlled manually or automatically either to provide a particular safe composition of the diluted stream or to prevent overspeeding of the gas motor and fan unit due to excessive energy input.

This inventive system is admirably suited to dilute normal evaporation gas from a liquid hydrogen railroad car or trailer. Such transports may for example be designed for 25 p.s.i.g. internal pressure. In such a case, the control valve 22 could be set for example to operate between 17 and 13 p.s.i.g. Thus, control valve 22 would be actuated by pressure sensitive controller 10 when the pressure in conduit 4 reaches 17 p.s.i.g. and the evaporation gas would be permitted to flow to motor 6. When the pressure in conduit 4 drops to 13 p.s.i.g. the controller 10 closes valve 22.

It has been found that for hydrogen, a gas pressure of only about 10 p.s.i.g. can develop sufficient power to operate the fan and thereby dilute the hydrogen evaporation stream in ambient air to below the lower flammability limit of 4% hydrogen by volume.

For diluting other gases in air, different minimum pressures to the gas motor would probably be required. However, for any hazardous gas considered, there will exist a minimum pressure from which expansion of the gas to atmospheric pressure will generate power adequate for moving sufficient air to produce satisfactory mixing and dilution. Although principally useful for diluting hydrogen gas, this system may be used for diluting other evaporation gases, such as methane, ethylene, fluorine, etc., to safe concentration levels. Also, the system is useful for both stationary and mobile equipment.

The physical arrangement of the equipment is optional, except that the duct downstream from the fan is preferably divided and the flow exhausted to atmosphere at more than one point, such as on opposite sides of a tank car. By this method, the effectiveness of the dilution process is less sensitive to air currents, etc.

The hazardous evaporation gas is preferably warmed by atmospheric heat to near ambient temperature, thereby adding the most heat to the gas and making it most suitable for expansion in a simple gas motor. Superheating the hydrogen gas to near ambient temperature by means of heat exchange portion 23 of conduit 4 adds energy to the hydrogen gas and thus permits the dilution system to operate satisfactorily at lower pressures. However, the evaporation gas may be warmed only to some lower temperature provided that sufficient energy is thereby added to the evaporation gas to drive the fan and obtain adequate dilution, and that the design of the control valve, work expander, and fan is compatible with this colder temperature stream.

While use of a positive displacement type gas motor is preferred for the reason of minimizing gas leakage, lower speed, and lower cost, other type gas-power driving devices may be used, such as turbines. Also, the fan may be a cage, centrifugal, or mixed flow type, instead of the preferred axial flow propeller type fan. If the desirable turbine operating speed is too great to be suitable for driving the fan, speed reduction by belt drive or gears may be used. Also, the driver and fan may be in separate enclosures if desired, with their shaft axes oriented at various angles to suit the space available.

While the present invention has been described in detail by referring to the preferred embodiment, it is to be understood that modifications may be made in the detail and arrangement of parts without departing from the spirit of the invention.

What is claimed is:

1. A method of diluting a pressurized hazardous gas in air which comprises; passing at least a portion of said pressurized hazardous gas to a work expansion device; passing the remaining pressurized hazardous gas to a valve expansion device; work expanding the gas passed to said work expansion device; expanding to atmospheric pressure the gas passed to said valve expansion device; driving a mixing device with the power generated by work expanding the gas passed to said work expansion device; discharging all of said expanded gas into the vicinity of said mixing device; mixing all of said discharged expanded gas with ambient air; and exhausting the resulting mixture to atmosphere at proportions which are not flammable and safe to humans.

2. A method for disposing of evaporation of a hazardous gas from a low-boiling liquefied gas stored in an insulated container which comprises; passing at least a portion of said pressurized hazardous gas to a work expansion device; heating such hazardous gas passed to said work expansion device to about ambient temperature; passing the remaining pressurized hazardous gas to a valve expansion device; work expanding the gas passed to said work expansion device; expanding to atmospheric pressure the gas passed to said valve expansion device; driving a mixing device with the power generated by work expanding the gas passed to said work expansion device; discharging all of said expanded gas into the vicinity of said mixing device; mixing all of said discharged expanded gas with ambient air; and exhausting the resulting mixture to atmosphere at proportions which are not flammable and safe to humans.

3. A method according to claim 1 wherein the hazardous gas is hydrogen.

4. A system for disposing of pressurized hazardous evaporation from a low-boiling liquefied gas comprising in combination; an insulated hazardous gas container; a work expansion device having an inlet for receiving pressurized gas from said gas container and an outlet; a conduit having an inlet end communicating with said insulated gas container and an outlet end communicating with the inlet of said work expansion device and being in heat exchange relationship with the ambient atmosphere; a mixing device operably associated with said work expansion device and adapted to draw ambient air through said mixing device from the intake side to the discharge side thereof; a diffuser ring adjacent said discharge side of said mixing device being adapted to receive expanded gas from said work expansion device and to discharge such gas throughout a plane essentially perpendicular to the direction of air issuing from said discharge side of said mixing device; a hood enclosing said work expansion device, said mixing device, and said diffuser ring whereby a safe dilute mixture of air and hazardous gas is passed to the atmosphere.

5. Apparatus according to claim 4 and including a valve positioned in the conduit connecting said gas container and said work expansion device, a pressure sensitive controller having an inlet connected to said container and means connected to said valve to actuate said valve in response to the pressure in said conduit.

6. Apparatus according to claim 4 wherein said work expansion device is a gas motor and said mixing device is a fan.

7. Apparatus according to claim 5 wherein said work expansion device is a positive displacement type air motor and said mixing device is an axial flow propeller type fan.

8. Apparatus according to claim 5 wherein a branch line is positioned between said conduit and said diffuser ring and a valve is positioned in said branch line whereby a portion of the pressurized hazardous gas is valve expanded before being delivered to said diffuser ring.

References Cited in the file of this patent

UNITED STATES PATENTS

| | | |
|---|---|---|
| 2,507,380 | Morrison | May 9, 1950 |
| 2,760,342 | Morrison | Aug. 28, 1956 |